Figure 1:
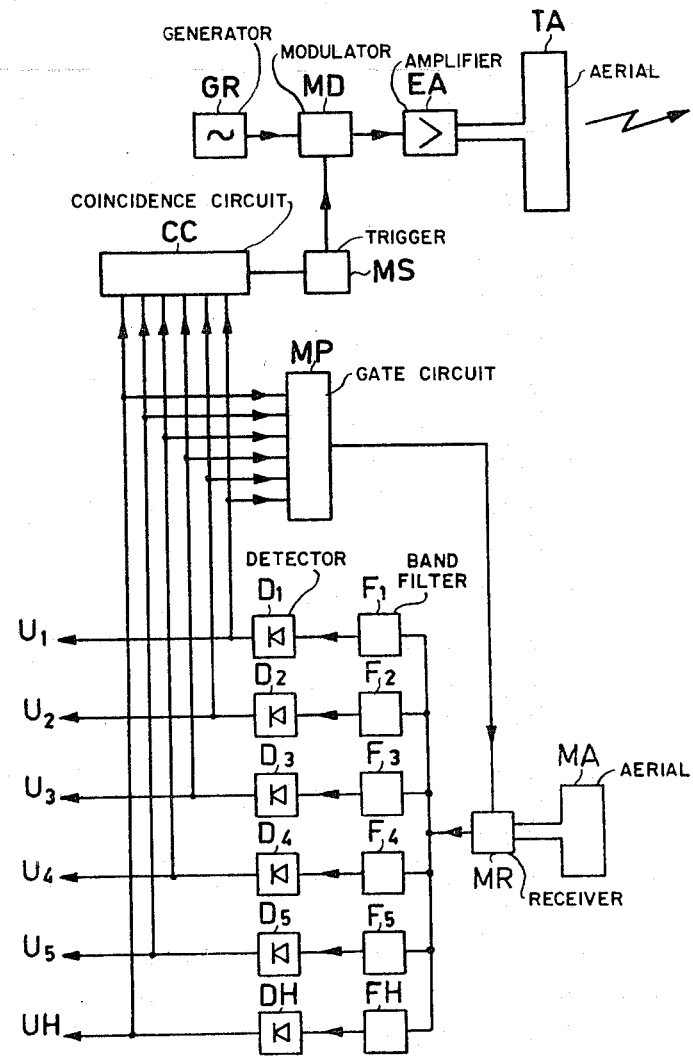

United States Patent Office 3,293,642
Patented Dec. 20, 1966

3,293,642
SIGNAL RESPONSIVE CODING ARRANGEMENT
Antonius Cornelis Maria Gieles, Emmasingel, Eindhoven, Netherlands, assignor to North American Philips Company, Inc., New York, N.Y., a corporation of Delaware
Filed Sept. 29, 1964, Ser. No. 400,169
Claims priority, application Netherlands, Oct. 2, 1963, 298,735
6 Claims. (Cl. 343—6.5)

The invention relates to an arrangement for identifying objects, for example, railway carriages or articles on a conveyor belt movable with respect to a testing device.

The requirements which must be imposed in practice on an arrangement for identifying railway carriages are particularly severe. Since a great plurality of data is desired, the information supplied must consist of a code number of ten or more decimal digits, each digit or each group of digits having a special meaning and characterizing, for example, the country of origin, the stand, the number of the carriage, the type of the carriage and so on. It must be possible for identification to be effected at a low speed or standstill of the train and also at a speed of, for example, 160 kms. per hour, in which latter case the time available for the identification is very short. For reasons of safety, the distance between the testing device and the train must not be smaller than 40 cms., while on the other hand, as a result of the different widths of the carriages, the distance may even amount to 90 cms. As a matter of course, the arrangement must operate in a reliable manner under all weather conditions, consequently also with snow and glazed frost. Moreover, it is desirable for the dimensions of the identification apparatus on the carriages to be small. A further particularly severe requirement consists in that it is not possible to use energy sources on the train, such as generators, dynamos driven by the wheels, traction energy and so on.

An identification arrangement is already known in which the testing device comprises means for the wireless transmission of energy to an answering device arranged on the carriages to be identified. This answering device comprises a plurality of generators having different characteristic frequencies and a distributor switch controllable by the testing device, all of which are fed by the energy received by radiation. The distributor switch is capable of switching successively into the circuit different combination of generators which characterize the object forming code signals consisting of a plurality of successive code groups each of which consists of a constant number of characteristic frequencies, which code signals are supplied back to the testing device by wireless transmission.

The energy transmission is inversely proportional to approximately the third power of the distance. When a carriage approaches the testing device, the energy received by radiation is initially still very low so that the generators oscillate only weakly or do not oscillate at all, while on the other hand the transmission of the signals from the answering device to the testing device is still weak so that the signal-to-noise ratio is unfavorable. The problem occurs to assess from which moment the code signals may be considered to be undisturbed. The fixation of the identification code must take place in the earliest possible phase with a view to the very short time which may be available in case of a high speed of the train. In such a case, a code not sensitive to interference, for example, a 2-out-of-5 code, is not yet fully reliable either with a view to the great variations in strength which may occur, and it is possible that the identification code must be received several times and be compared with the preceding code to permit of asecertaining the presence or absence of an error. However, the apparatus required to this end is comparatively complicated, which is undesirable.

The invention provides a cheap and reliable solution to the problem. In the identification arrangement according to the invention, the distributor switch has a fixed rest position in which all the characteristic generators are switched into circuit, while the testing device comprises a comparison arrangement which responds when all characteristic frequencies are received at the same time with a strength exceeding a given threshold value and which transmits a signal to the answering device for actuating the distributor switch. The distributor switch is preferably of a type known per se having a fixed rest position and proceeding automatically, while in synchronism with the proceeding in steps of the switch after the actuation thereof, a synchronization signal is transmitted by the answering device to the testing device.

The invention will now be described more fully with reference to the accompanying drawing showing diagrammatically an embodiment of an identification arrangement of railway carriages.

Figure 2:
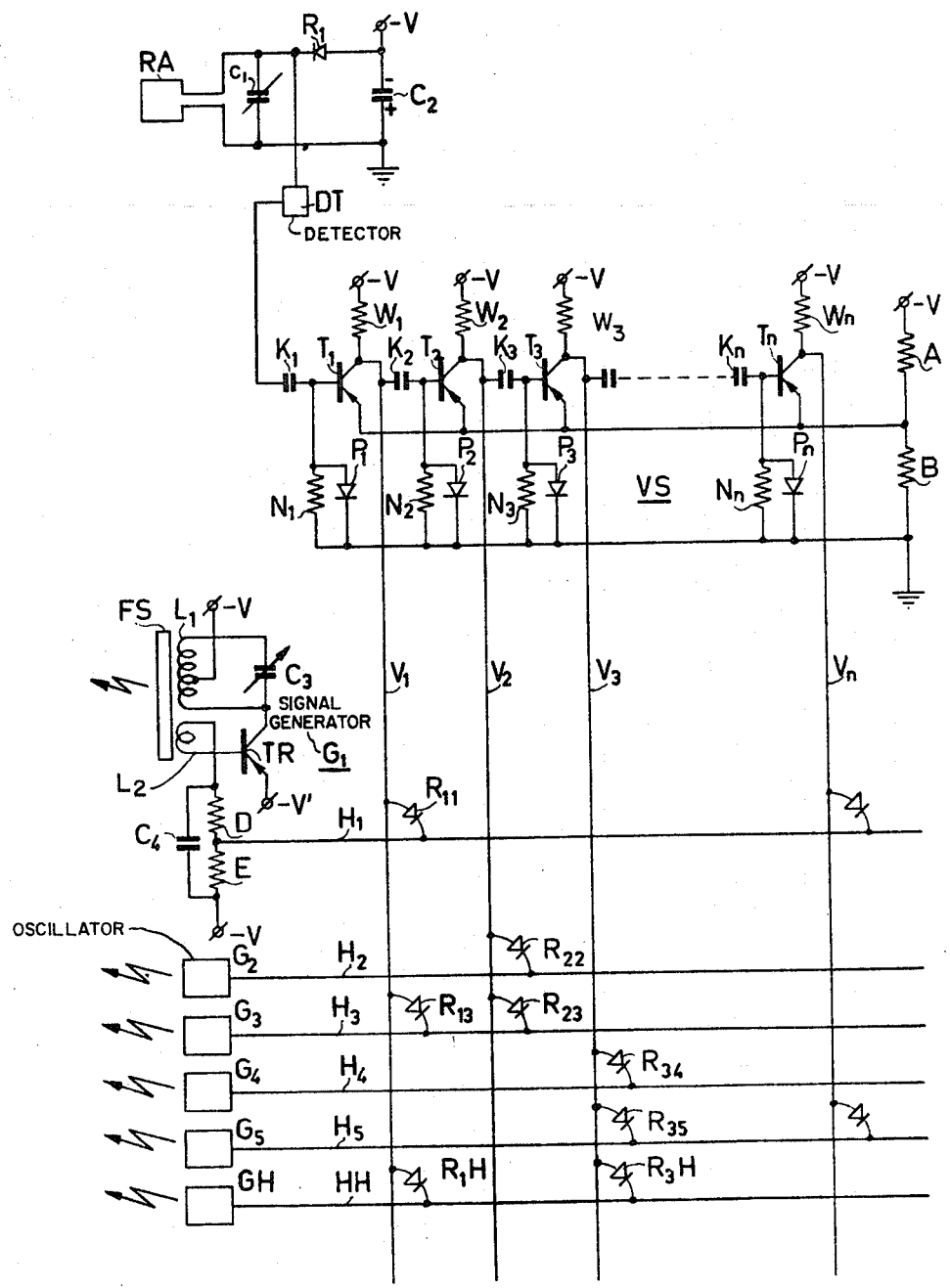

FIG. 1 shows a testing device which is arranged, for example, on a fixed place along the railway track, while FIG. 2 shows an answering device which must be arranged on the carriage.

The testing device shown in FIG. 1 comprises a generator GR which is coupled through a modulator MD and a transmitter amplifier EA to a transmitter aerial TA. The energy radiated by the aerial TA is collected during the passage of the carriage by the aerial RA of the answering device shown in FIG. 2 which is tuned by a capacitor C1 to the frequency of the generator GR. The aerial TA is preferably a frame aerial of elongated shape so that when a carriage passes at a high speed, there exists nevertheless a satisfactory coupling between the aerials TA and RA for a comparatively long time. The oscillation collected by the aerial RA is rectified by a rectifier R1 so that a supply voltage —V is produced across a smoothing capacitor C2, which voltage feeds the various transistors of the answering device.

The answering device comprises a distributor switch VS for switching successively into the circuit given characterizing combinations of generators G1, G2, G3, G4, G5 and GH. The distributor switch VS comprises a number of transistors T1, T2 . . . T$n$ equal to the number of digits in the identification code, for example, ten or more. The emitters of the transistors are connected to a tap on the voltage divider AB which is connected between the terminals —V and the ground side of capacitor C2. The base electrodes are connected through the parallel combination of a resistor N1, N2 . . . N$n$ and a rectifier P1, P2 . . . P$n$ to ground so that the voltage of the base electrodes normally exceeds that of the emitters and the transistors are cut off. The collectors of the transistors are each connected to one of the vertical conductors V1, V2 . . . V$n$ and further through a resistor W1, W2 . . . W$n$ to the point of supply —V. The collectors are further connected through capacitors K2, K3 . . . K$n$ to the base of the subsequent transistor in the series.

The distributor switch VS, which is of a known type, operates as follows. As already stated, all the transistors are cut off in the rest position. When a negative pulse is transmitted through a capacitor K1 to the base of the first transistor T1, this transistor becomes conducting, while the voltage of the collector and consequently also that of the conductor V1 assumes a higher value. The voltage of the base of the transistor T2 does not increase, however, since the pulse supplied through the capacitor K2 is conducted away through the rectifier P2. The capacitor K2 is then charged. After a given period of time which depends upon the time constant determined by the capacitor K1 and the resistor N1, the capacitor K1 is discharged to such an extent and the voltage of the base of the transistor T1 has increased to a value such that this transistor is cut off again, as a result of which the voltage of the collector decreases and the capacitor K2 transmits a negative pulse to the base of the transistor T2. Consequently, the transistor T2 becomes conducting, and the voltage of the conductor V2 increases until the base voltage has increased to a value such that the transistor is cut off. In this manner, the transistors become conducting in order of succession for a short time and the voltages of the conductors V1, V2 . . . V$n$ assume a higher value. After the last transistor T$n$ has been cut off again, all the transistors remain again in the cut-off condition until a pulse is again supplied through the capacitor K1.

The generators G1, G2, G3, G4 and G5 which serve for producing characteristic frequencies and the generator GH which serves for producing synchronizing signals have different natural frequencies, but are otherwise designed in the same manner. By way of example, the generator G1 is shown in greater detail. It comprises a transistor TR the collector of which is connected to the oscillator circuit L1, C3 which determines the frequency of the generator. A tapping on the inductor L1 is connected to the point of supply —V. The base electrode is connected through a feedback winding L2 and a potentiometer DE shunted by a capacitor C4 to the point of supply —V. The coils L1 and L2 are coupled to the same rod of ferrite FS which also acts as a transmitter aerial. The emitter is connected to a point of supply —V', for example, a tapping on the potentiometer AB. The transistor TR is normally conducting so that the generator G1, just as the remaining generators, normally produces oscillations which are transmitted through the receiving aerial MA to the receiver MR of the testing device shown in FIG. 1. The output of the receiver MR is connected to a plurality of band filters F1, F2, F3, F4, F5 and FH each of which passes one of the frequencies of the generators. The outputs of the filters are connected through detectors D1, D2, D3, D4, D5 and DH to the output terminals U1, U2, U3, U4, U5 and UH and further to a coincidence circuit CC and to a gate circuit MP.

When a railway carriage approaches the testing device, the transmission of energy to the answering device is initially low and the generators oscillate weakly or not at all, while on the other hand as a result of the comparatively great distance, the transmission of the oscillations of the generators G1 to GH to the aerial MA is still low. The reliability of the transmission of the information is consequently not yet guaranteed. As the carriage approaches the testing device, however, the transmission is improved. The coincidence circuit CC tests the strength of the incoming signals and when the strength of all signals has exceeded a given limit value so that the reliability of the connection may be considered sufficient, the coincidence circuit CC responds and passes a signal to the monostable trigger arrangement MS which subsequently passes a short pulse to the modulator MD, as a result of which the supply signal emitted by the amplifier EA is interrupted for a short time.

The answering device comprises a detector DT which is connected to the aerial RA and which responds to the short interruption of the supply of energy received by radiation and which supplies through capacitor K1 a negative pulse to the base of the first transistor T1 of the distributor switch VS.

The distributor switch VS now proceeds automatically in the manner described hereinbefore, as a result of which the voltages of the vertical conductors V1, V2 . . . V$n$ are increased for a short time and the identification code is produced. The vertical conductors V1 . . . V$n$ are each connected through rectifiers to each time two of the characteristic generators G1, G2, G3, G4 and G5 in accordance with the desired code.

For example, the conductor V1 is coupled through a rectifier R11 to the horizontal conductor H1 which is connected to the tapping on the potentiometer DE of generator G1 and further through a rectifier R13 to the horizontal conductor H3 which controls the generator G3. In the same manner, the conductor V2 is coupled through rectifiers R22 and R23 to the horizontal conductors H2 and H3 which are connected to the generators G2 and G3, and so on. The rectifiers are normally cut off. When the voltage of conductor V1 is increased the rectifiers R11 and R13 become conducting and the voltages of the base electrodes of the transistors in the generators G1 and G3 are increased so as to exceed that of the emitter so that these generators are cut off. During the next period during which the conductor V2 assumes a higher voltage the generators G2 and G3 are cut off and so on.

Consequently, during each code group, two of the characteristic generators at a time are cut off, while the three remaining generators oscillate. In this case, the code is consequently constituted by a 3-out-of-5 code. As a matter of course, it would also have been possible to cut off three of the generators at a time so that a 2-out-of-5 code would be produced. However, this would have required an additional coupling rectifier for each code group.

The synchronizing generator GH is coupled in a corresponding manner through rectifier R1H, R3H and so on to all the odd-numbered vertical conductors V1, V3, V5 and so on, so that the generator GH is cut off during the odd periods of the code series and oscillates during the rest condition and the even periods of the code series. The transmitted identification code signals appear in the corresponding combination at the outputs U1, U2, U3, U4 and U5 of the testing device shown in FIG. 1 and may be read and further processed in known manner which is not further described with the aid of a synchronizing code which appears at the output UH. The measure described above ensures that the scanning of the identification code is effected at a moment at which the coupling in both directions between the testing device and the answering device is sufficiently strong.

The strength of the energy transmission is approximately inversely proportional to the third power of the distance. With a view to the different widths of the carriages, the shortest distance at which an answering device passes the testing device may vary in practice between 40 cms. and 90 cms. As a matter of course, the arrangement had to be proportioned so that even at the maximum passing distance, a reliable operation is guaranteed. At a small passing distance, there is a danger of the receiving means being overdriven. For this reason, use is made of an automatic strength control in the receiver MR which receives to this end a control voltage of the gate MP which is connected to the outputs U1, U2 . . . UH. The control voltage may be constituted, for example, by the strongest of the signals produced at these outputs.

What I claim is:

1. A signalling system for uniquely identifying an object movable with respect to a reference point, comprising means for transmitting a first signal from said object to said point, said first signal having a magnitude inversely proportional to the distance between said object and said point, threshold gating means located at said point and responsive to said first signal for producing a second signal when said first signal exceeds the threshold of said gating means, means for transmitting said second signal to said object, means responsive to said second signal for modifying said first signal to create a composite signal uniquely descriptive of said object, and decoding means responsive to said composite signal for indicating the identity of said object.

2. A signalling system for identifying an object movable with respect to a reference point, comprising a testing device located at said point and an answering device located at said object, said testing device including a signal receptor, decoding means coupled to said receptor, coincidence level gating means coupled to said decoding means, and transmitting means connected to said gating means, said answering device including a plurality of generators having different characteristic output frequencies, means coupling the output of said generators to the receptor of said receiver, the relative transmitted strength of said generators increasing inversely with the distance between said object and said reference point, a selectively energizable distributor switch having switched and unswitched states coupled to each of said generators, said switch, in its switched state, causing certain of said generators to oscillate in a combination uniquely descriptive of said object, said switch energized by transmission of a signal from said transmitting means, said transmitting means responsive to said coincidence level gate when the transmitted strength of said oscillators during the unswitched state exceeds said level, the distance between said testing and answering devices having decreased sufficiently.

3. The combination of claim 2 wherein said signal receptor includes an aerial and a receiver unit coupled thereto and the output of said decoder includes a gate circuit, said gate circuit supplying a control signal varying in accordance with the strength of said decoded signal, and means coupling the output of said gate circuit to said receiver unit whereby said control signal is employed to prevent said unit from overdriving.

4. The combination of claim 2 wherein said distributor switch comprises a progressively switched multistage pulse stepper, the number of stages in said switch equalling the number of consecutive portions of information indicia forming said uniquely descriptive oscillatory combination, and means coupling certain of said stages to certain of said generators for forming said unique oscillatory combination.

5. A signalling system for identirying an object movable with respect to a reference point, comprising a testing device located at said point and an answering device located at said object, said testing device including a signal receptor, decoding means coupled to said receptor, coincidence level gating means coupled to said decoding means, and transmitting means connected to said gating means, said answering device including a plurality of generators having different characteristic output frequencies and including one synchronizing generator and a plurality of information generators, means coupling the output of said generators to the receptor of said receiver, the relative transmitted strength of said generators increasing inversely with the distance between said object and said reference point, a selectively energizable distributor switch coupled to each of said generators, said switch causing certain of said information generators and said synchronizing generator to oscillate in a combination uniquely descriptive of said object, said switch energized by transmission of a signal from said transmitting means, said transmission means responsive to said coincidence level gate when the transmitted strength of said oscillators exceeds said level, the distance between said testing and answering devices having decreased sufficiently, said decoding means including a plurality of filters for decoding each of the transmitted information frequencies, and means responsive to said synchronizing generator for synchronizing the scan period of said decoder with the peak signal transmission strength.

6. The combination of claim 5 wherein said distributor switch comprises a progressively switched multistage pulse stepper, the number of stages in said switch equalling the number of consecutive portions of information indicia forming said uniquely descriptive oscillation combination, means coupling certain of said stages to certain of said information generators for forming said unique oscillatory combination, and means coupling every other of said stages beginning with the first stage to said synchronizing generator.

References Cited by the Examiner
UNITED STATES PATENTS 3,054,100 9/1962 Jones _____ 343—6.5
3,145,380 8/1964 Currie _____ 343—6.5

CHESTER L. JUSTUS, Primary Examiner.

LEWIS H. MYERS, RODNEY D. BENNETT,
Examiners.

P. M. HINDERSTEIN, Assistant Examiner.